United States Patent
Schlegel et al.

(10) Patent No.: US 7,226,011 B2
(45) Date of Patent: Jun. 5, 2007

(54) STACKER RECLAIMER METHOD AND APPARATUS

(76) Inventors: Hans J. Schlegel, 3601 84th Cir. North, Minneapolis, MN (US) 55443-2767; Helmut Wolf, Sielkemp 52, Braumschweig (DE) 38112

( * ) Notice: Subject to any disclaimer, the term of this patent is extended or adjusted under 35 U.S.C. 154(b) by 111 days.

(21) Appl. No.: 10/636,681

(22) Filed: Aug. 7, 2003

(65) Prior Publication Data

US 2005/0040015 A1 Feb. 24, 2005

(51) Int. Cl.
*B02C 13/286* (2006.01)
(52) U.S. Cl. ............ 241/186.35; 241/34; 241/101.71
(58) Field of Classification Search .......... 241/24, 241/101.7, 186.35, 200; 198/509, 519
See application file for complete search history.

(56) References Cited

U.S. PATENT DOCUMENTS

| 681,142 | A | * | 8/1901 | Seitz ............... 209/246 |
| 3,472,357 | A | | 10/1969 | Strocket ............ 198/36 |
| 3,509,985 | A | | 5/1970 | Fisher et al. ......... 198/36 |
| 4,154,332 | A | | 5/1979 | Schlegel ............ 198/507 |
| 4,333,561 | A | | 6/1982 | Schlegel ............ 198/703 |
| 4,363,396 | A | * | 12/1982 | Wolf et al. .......... 198/508 |
| 4,377,258 | A | * | 3/1983 | Kipp, Jr. ............ 241/27 |
| 4,629,060 | A | | 12/1986 | Schlegel et al. ....... 198/508 |
| 4,795,103 | A | * | 1/1989 | Lech ............... 241/77 |
| 5,230,475 | A | * | 7/1993 | Gerner .............. 241/34 |
| 5,240,114 | A | * | 8/1993 | Parker et al. ......... 209/17 |
| 5,310,121 | A | * | 5/1994 | Nilson et al. ........ 241/27 |

\* cited by examiner

*Primary Examiner*—Lowell A. Larson
*Assistant Examiner*—Jason Y. Pahng
(74) *Attorney, Agent, or Firm*—Butler, Snow, O'Mara, Stevens & Cannada, PLLC

(57) ABSTRACT

This invention provides an apparatus for handling bulk material as located at circular or linear storage site. More specifically, a reclaimer apparatus is described having a platform mounted on one or more wheel track assemblies arranged to roll on at least one rail. A pivotal reclaim conveyor assembly is made of a head shaft and a tail shaft and means to support a plurality of rakes, wherein the plurality of rakes are spaced at intervals in a continuous loop around the pivotal reclaim conveyor assembly. The fixed incline conveyor assembly having a head shaft and a tail shaft, the incline conveyor assembly having means to support a plurality of buckets, the plurality of buckets being spaced at intervals in a continuous loop around the inclined conveyor assembly.

8 Claims, 4 Drawing Sheets

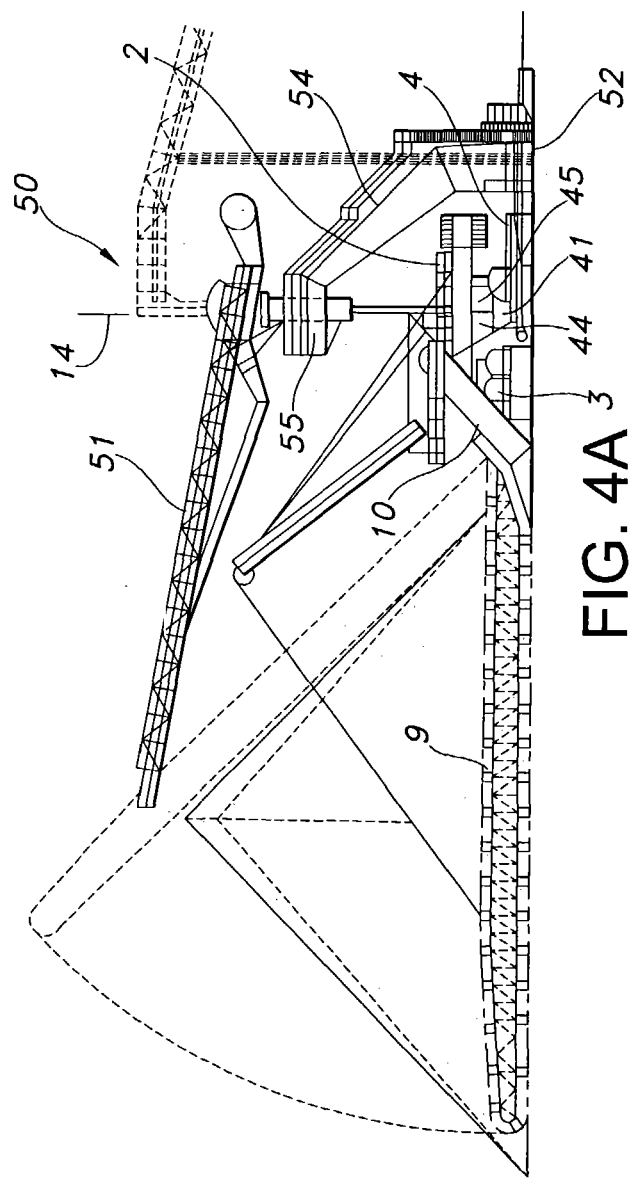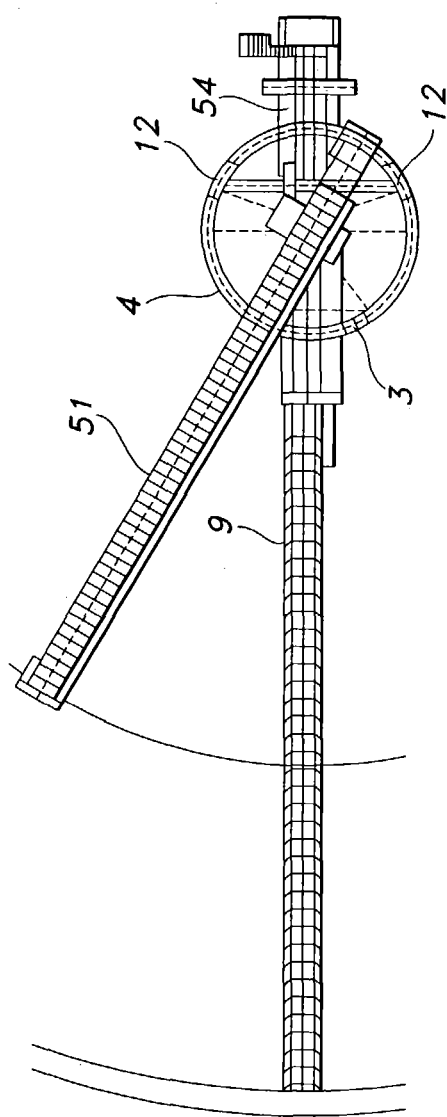

STACKER RECLAIMER METHOD AND APPARATUS

RELATED APPLICATIONS

Not Applicable

STATEMENT REGARDING FEDERALLY SPONSORED RESEARCH OR DEVELOPMENT

Not Applicable

REFERENCE A "MICROFICHE APPENDIX"

Not Applicable

FIELD OF THE INVENTION

This invention relates to a stacker-reclaimer method and apparatus for moving stored bulk material.

BACKGROUND OF THE INVENTION

The prior known apparatus for handling bulk material as located at a storage site have included several versions of well known stacker-reclaimer apparatus as illustrated in U.S. Pat. Nos. 3,472,357; 3,509,985; 4,363,396; and 4,629,060. These apparatus have reclaimer conveyors which move out along the top side of the reclaimer boom, articulate around a sprocket or wheel at the distal end of the reclaimer boom, move back toward the machine pushing reclaimed bulk material, e.g. wood chips, between the chain attachments, e.g. rakes, articulate around a sprocket or wheel in the knuckle area, move up an inclined deck pushing the wood chips between the rakes, articulate once more around a drive or head sprocket, move over the top side of the incline conveyor with the chips falling over the top of the incline conveyor chute and back to the original position along the top of the reclaimer conveyor with each chain, typically two per machine, forming a continuous loop.

The previously described conveyor portion of the stacker-reclaimer apparatus exhibits difficulty in maintaining reliable and trouble free alignment of a reclaim conveyor chains between the reclaim boom and incline sections of the conveyor.

In cold climates, icy or lumpy aggregated material being moved by the plurality of rakes around the knuckle or pivot point of the reclaimer boom and up the incline jammed or damages the plurality of rakes. Jams can also occur with aggregated material between the plurality of rakes and the incline conveyor deck.

BRIEF SUMMARY OF THE INVENTION

The present invention provides a unique approach for an apparatus that is used in the build up and discharge of stored bulk material.

Contrary to conventional equipment used before in forming or discharging a pile of bulk material, the present invention is configured to allow discharge of bulk material by the reclaimer conveyor boom's plurality of rakes while being scooped up by the plurality of buckets on the incline conveyor, moving in an opposite direction. The plurality of buckets are filled and carried on the incline conveyor to the discharge end. The advantage of this arrangement is that ice lumps or any other aggregated material can be scooped up without jamming or pinching lumps between buckets (or rakes) and the chute's floor. In the reclaimer apparatus commonly found in use, boom-deployed chain conveyor attachments such as rakes are used to dislodge stored bulk material, for example wood chips used in pulp and paper making, from a storage pile and move them up an inclined portion of the same conveyor, down a discharge chute and towards a take-away conveyor leading to the next material process point. As the rakes, mounted at intervals along the chain, approach the floor of the inclined chute, they fan out around a sprocket or wheel, which directs the chain upward along the incline. As the chains traverse around the wheels and begin to straighten out, the rakes move back together, compressing the bulk material trapped between them. If the bulk material contains aggregated chunks such as icy lumps, these can damage the rakes or other machine parts as they attempt to move the chunks or lumps through.

More specifically, this invention relates to:

a reclaimer apparatus for handling bulk material as located in a pile at a storage site thereof The reclaimer apparatus is made of three major components:

(i) a platform mounted on one or more wheel truck assemblies arranged to roll on at least one rail; the platform having a plurality of means to support a pivotal reclaim conveyor assembly and the incline conveyor assembly;

(ii) a pivotal reclaim conveyor assembly having a head shaft and a tail shaft, the pivotal reclaim conveyor assembly having means to support a plurality of rakes, the plurality of rakes being spaced at intervals in a continuous loop around the pivotal reclaim conveyor assembly, the pivotal reclaim conveyor assembly being driven by a first motor; and (iii) a fixed incline conveyor assembly having a head shaft and a tail shaft, the fixed incline conveyor assembly having means to support a plurality of buckets, the plurality of buckets being spaced at intervals in a continuous loop around the incline conveyor assembly, the plurality of buckets being positioned to receive bulk material from the pivotal reclaim conveyor assembly, the fixed incline conveyor assembly being driven by a second motor.

Additionally this invention relates to a method for handling bulk material as located in a pile at a storage site, thereof, these steps include:

(i) providing a platform mounted on one or more wheel truck assemblies arranged to roll on at least one rail. The platform having a plurality of means to support a pivotal reclaim conveyor assembly and a fixed incline conveyor assembly;

(ii) providing a pivotal reclaim conveyor assembly having a head shaft and a tail shaft, the pivotal reclaim conveyor assembly having means to support a plurality of rakes, the plurality of rakes being spaced at intervals in a continuous loop around the pivotal reclaim conveyor assembly, the pivotal reclaim conveyor assembly being driven by a first motor;

(iii) transporting bulk material from the pile in the plurality of rakes, when the plurality of rakes are on the bottom of the continuous loop;

(iv) providing a fixed incline conveyor assembly having a head shaft and a tail shaft, the fixed incline conveyor assembly having means to support a plurality of buckets, the plurality of buckets being spaced at intervals in a continuous loop around the fixed incline conveyor assembly, the plurality of buckets being positioned to receive bulk material from the pivotal reclaim conveyor assembly, the fixed incline conveyor assembly being driven by a second motor;

(v) transferring the bulk material from the plurality of rakes to the plurality of buckets; and (vi) transporting the bulk material in the plurality of buckets, when one of the plurality of buckets is on top of the continuous loop, to the discharge chute.

BRIEF DESCRIPTION OF THE DRAWINGS

FIG. 4A is a side elevational view of a stacker-reclaimer apparatus including an incline column support for the stacker boom.

FIG. 4B is a plan view of a stacker-reclaimer apparatus including an incline column support for the stacker boom.

DETAILED DESCRIPTION OF THE INVENTION

Figure 1:
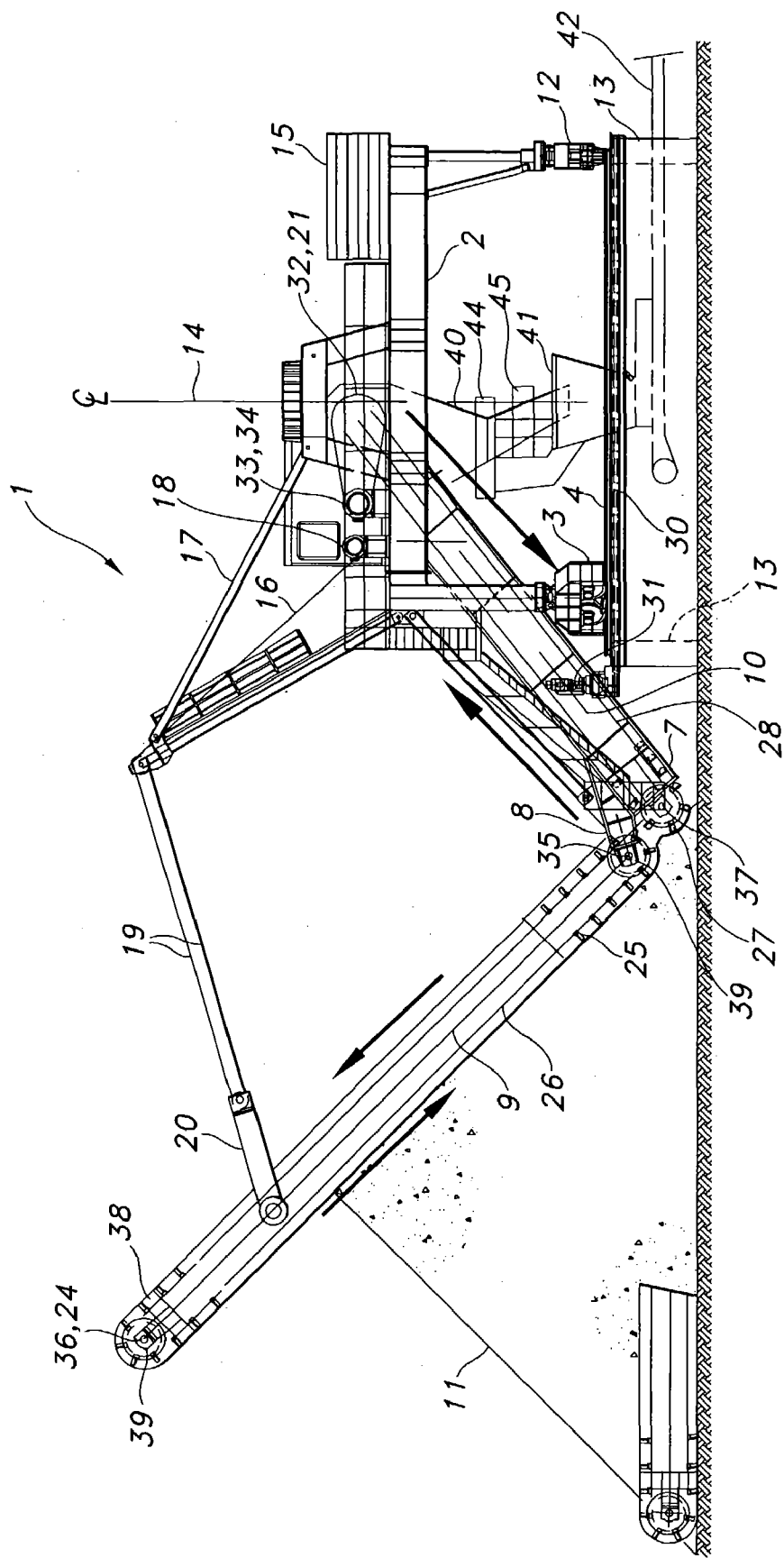
FIG. 1 is a side elevational view of the reclaimer portion of a stacker-reclaimer apparatus or of a reclaimer apparatus only if not part of a stacker-reclaimer apparatus.
Figure 2:
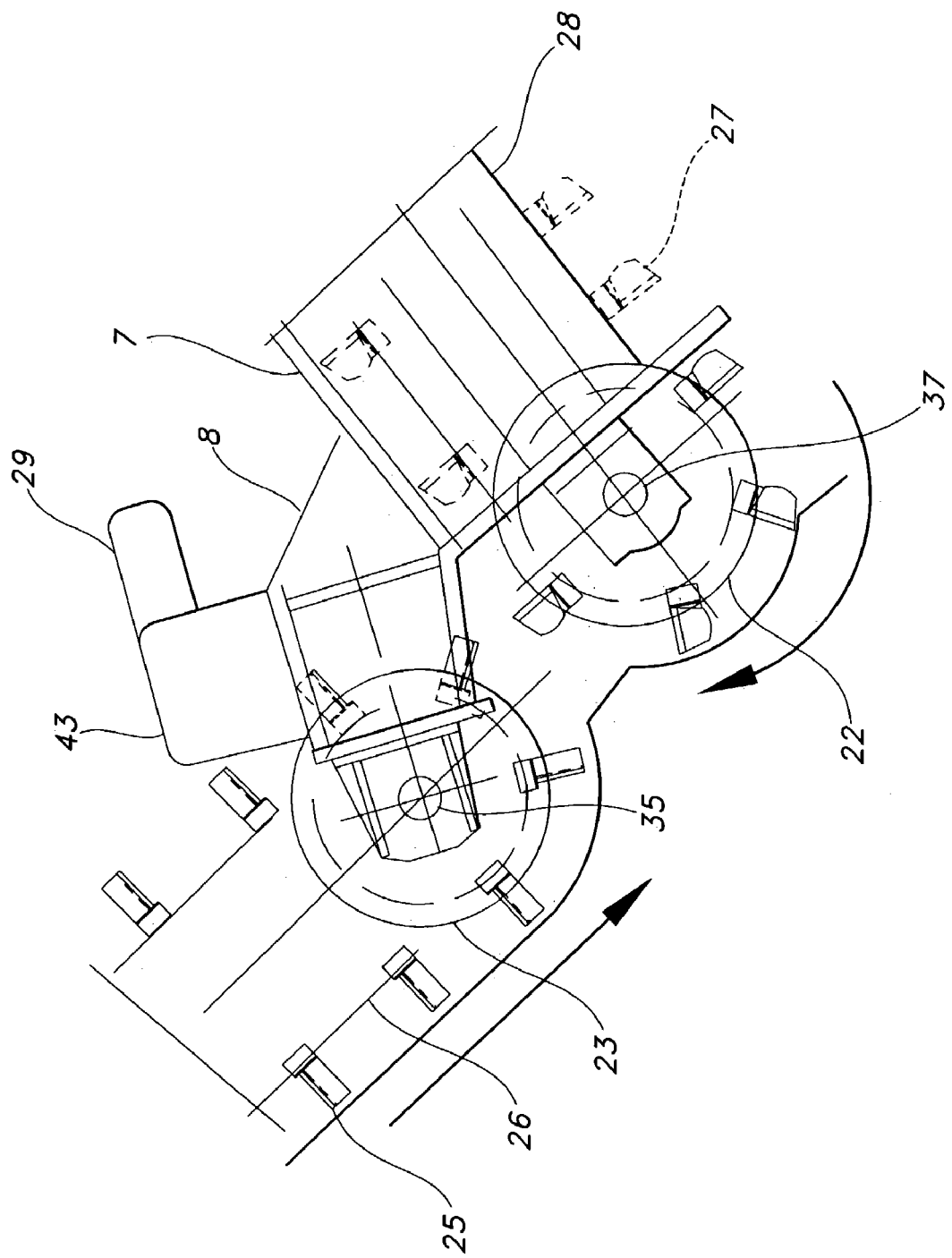
FIG. 2 is a side elevational view of a portion of FIG. 1 showing the-interaction of reclaimer conveyor assembly and incline conveyor assembly.

Referring to FIGS. 1 and 2, the lower portion of a circular stacker-reclaimer apparatus is shown. The upper or stacker portion of the machine, not shown in FIG. 1, is generally concentrically mounted above the reclaimer apparatus 1 with a common vertical axis of rotation 14 passing through the slewing or pivot axes of both stacker and reclaimer apparatus 1. The main platform 2 is mounted on one or more wheel truck assemblies 3 and 12, which are supported, by support rail ring 4 and rail support 13. The reclaimer apparatus 1 is made of a pivotal reclaim conveyor assembly 9 mounted to a main platform 2. One or more wheel truck assemblies may be applied to the front of the reclaimer apparatus 1, that is, the side where the pivotal reclaim conveyor assembly 9 is mounted, or to the rear of the reclaimer apparatus 1, that is, the side opposite the pivotal reclaim conveyor assembly 9. Counterweights 15 to counterbalance the pivotal reclaim conveyor assembly 9 are mounted on the rear of the apparatus, generally on the main platform 2 or on a substructure of the main platform. The reclaimer apparatus 1 can operate on a straight line or linear track or on a curved or substantially circular track, the track generally being made of support rail 4 mounted on rail support 13. In its function the flow of reclaimed bulk material 11 is placed on a take-away conveyor assembly 42 or on other means to transport the material to a process input point (not shown). As the bulk material 11 is handled first by pivotal reclaim conveyor assembly 9, fixed incline conveyor assembly 10, discharge chute 40, separation device 44, hammermill 45, and receiving hopper 41 it must finally be directed onto take-away conveyor assembly 42. For a circular machine, the flow of bulk material exiting the discharge chute 40 or hammermill 45 is most usefully placed into stationary receiving hopper 41 at or near the vertical axis of rotation 14 of the reclaimer apparatus 1. This axis 14 may be referred to as the center of the apparatus.

The pivotal reclaim conveyor assembly 9 is pivotably mounted to structural member 8, which supports the head end of the conveyor 35. The pivotal reclaim conveyor assembly 9 can pivot in a vertical plane about an axis close to or through the head shaft 35 allowing the plurality of rake 25 to move bulk material during conveyor operation from a storage pile 11 as the tip or tail end of the reclaim conveyor pivots downward at a rate that provides the desired reclaimed material flow rate. This pivoting rate depends on the speed of the conveyor chains 26 as well as the length of the pivotal reclaim conveyor assembly 9. The pivoting action is produced by the operations of hoist 18 and cable parts 16 and 19 acting on boom yoke 20 to either raise or lower the pivotal reclaim conveyor assembly 9. The hoist 18 is controlled by a programmable logic controller or other control system (not shown).

The pivotal reclaim conveyor assembly 9 is made of a framework 38 sized to establish the length and width of the conveyor, a head shaft 35 and head sprocket 23 mounted at the drive end of the framework 38 and a tail shaft 36 and tail sprocket 24 mounted at the opposite end of the framework 38, both head and tail shafts mounted rotatably in bearings 39. The head shaft 35 is fitted with a drive motor 29 and speed reducer 43 to provide power to turn the head shaft 35; alternatively a hydraulic or other type of motor may be used instead of motor 29 and speed reducer 43.

The pivotal reclaim conveyor assembly 9 is made of at least one continuous chain loop 26 around a head or drive sprocket 23 and around a tail sprocket 24, both sprockets mounted rotatably in bearings 39 at opposite ends of the pivotal reclaim conveyor assembly 9. The chain 26 operates in such a direction that the plurality of rakes 25 on the upper side move away from the center of the reclaimer 1. The plurality of rakes 25 are supported by the pivotal reclaim conveyor assembly 9. The pivotal reclaim conveyor assembly 9 is a structural guiding system connected which in turn guides the chain 25 to which the plurality of rakes 25 are attached. The pivotal reclaim conveyor assembly 9 functions by transporting bulk material from the pile in the plurality of rakes 25, when the plurality of rakes 25 is on the bottom of the continuous loop. The weight of the pivotal reclaim conveyor assembly 9 is balanced approximately by counter weight 15. The head end of the conveyor is situated close to the point of deposition of bulk material on the take-away conveyor and the tail end is farther away. The motor 29 and speed reducer 43 drive the head or drive sprocket 23 by acting on the head shaft 35, passing through the drive sprocket 23 which engages the chain 26. An attachment to the chain 26 such as a rake 25 is used to propel bulk material 11 towards the machine 1 where it brought into proximity with the fixed incline conveyor assembly 10 which functions to move bulk material 11 further. Preferably two chain loops 26 are used and the attachments such as plurality of rakes 25 are mounted between the two chain loops 26 for stability while propelling bulk material. The plurality of attachments or rakes 25 is required and is mounted at intervals to the chains 26.

The function of the fixed incline conveyor assembly 10 is to elevate the movement of bulk material so that the flow may be directionally controlled as it is deposited on the take-away conveyor assembly 42. The incline fixed conveyor structure 7 carrying the fixed incline conveyor assembly 10 is incorporated in the reclaimer assembly 1 or main platform 2 and is thus fixed to the main platform 2. The elevation thus obtained can also provide room for the inclusion of at least one device to separate the aggregated or lumpy bulk material from the acceptable or nonaggragated bulk material and a device to reduce the aggregated material to acceptable size before both material streams are deposited on the take-away conveyor 42. The fixed incline conveyor assembly 10 is powered by its own motor 33 and speed reducer 34 acting on head shaft 32 which are independent of other motors within the machine; the reclaim conveyor is powered by a separate motor 29 and speed reducer 43. A fixed incline conveyor assembly 10 powered by drive motor 33 and gear reducer 32 incorporates a loop or loops of chain 28 which pass around head shaft 32 and head sprocket 21 and tail shaft 37 and tail sprocket 22 and is supported by structural support 7. The incline conveyor chains(s) 28 carries a plurality of buckets 27 spaced at intervals along the chain(s) 28. The chain(s) 28 and plurality of buckets 27 move in a direction such that the plurality of buckets 27 on the upper side of the fixed incline conveyor assembly 10 moves uphill on the incline and the plurality of buckets 27 on the lower side of the fixed incline conveyor assembly 10 move downhill.

The fixed incline conveyor assembly 10, which operates independently from pivotal reclaim conveyor assembly 9, is powered by drive motor 33 and speed reducer 34 acting on head shaft 32 and head sprocket 21 to cause the bucket attachments to transfer reclaimed bulk material from the vicinity of the head end of pivotal reclaim conveyor assembly 9 and deposit it into discharge chute 40 located near the head end 32 of the fixed incline conveyor assembly 10.

One application of the reclaimer apparatus 1 is to move wood chips from outdoor bulk storage piles 11 onto take-away conveyor assembly 42. In warm weather the chips are loose, free flowing and unaggregated. In winter or cold climates, snow, ice or freezing rain may cause a portion of the chips to freeze or aggregate into chunky or lumpy balls which, if transferred to a take-away conveyor which has an inclined section to it, may roll backwards and form pile-ups and spills on the take-away conveyor. Further, such lumps may damage the plurality of rakes 25 or other machine parts if they become jammed in the plurality of rakes 25. The fixed incline conveyor assembly 10 advantageously provides elevation at its upper or head end 32 such that the flow of reclaimed bulk material 11 can be processed using additional pieces of equipment either on board the machine or stationary mounted to separate and reduce aggregated or frozen lumps of material 11 to unaggregated or normal size and then be funneled into receiving hopper 41 and onto take-away conveyor assembly 42. Without the elevation provided by fixed incline conveyor assembly 10, the handling of bulk material 11 would be similar to some existing machines wherein the plurality of rake attachments 25 on the pivotal reclaim conveyor assembly 9 simply move the material substantially horizontally across a retaining wall and transfer table (see U.S. Pat. No. 3,509,985 FIG. 1 which shows the moving of the material via transfer table), spilling material onto a take-away conveyor e.g. 42 for a linear reclaimer, whereas for a circular reclaimer an intermittent belt, screw or other type of conveyor slightly (or what ever is needed) inclined and attached to and rotate with reclaimer frame conveys the bulk material to the take-away conveyor e.g. 42 via a hopper type, this concept is very similar as shown in U.S. Pat. No. 3,509,985 in FIG. 1 with the retaining wall. The action of fixed incline conveyor assembly 10 with filled plurality of buckets 27 carrying bulk material along the top of the incline conveyor does not require the use of a transfer table and/or retaining wall as in some existing designs. This applies to either circular or linear machines.

Different means 44 to separate aggregated from nonaggregated material may be used such as disc screens, perforated screens, or the like.

Different means 45 to reduce or crush the aggregated material down to normal or unaggregated size may be used such as rotary crushers, hammermills, or the like.

A discharge chute 40, formed to provide a space with enclosed sides is positioned to receive the flow of chips from the incline conveyor and has an open bottom to allow a controlled directional flow of reclaimed bulk material to proceed substantially downward either directly into a receiving hopper 41 or through a separation device 44 such as a disc screen to separate normal unaggregated material from aggregated material such as icy lumps. The aggregated material can be directed through a crusher 45 such as a hammermill and the resized material and unaggregated material can then be directed into the receiving hopper 41 and thence onto the take-away conveyor assembly 42.

The receiving hopper 41 is a stationary device normally mounted above or on the take-away conveyor assembly 42. It is usually formed of an open top to receive deposited material and an open bottom to allow the material to fall through to the take-away conveyor and enclosed sides, sealed against the moving take away conveyor assembly 42, to keep material and dust within the conveyor enclosure.

The stored bulk material 11 is reclaimed from storage by pivotal reclaim conveyor assembly 9. Pivotal reclaim conveyor assembly 9 is made of a loop or loops of chain 26 upon which are mounted a plurality of rakes 25 spaced at intervals along the chain 26. More specifically, as shown in FIG. 2, chain loops 26 pass around head sprocket 23 and head shaft 35 and tail sprocket 24 and tail shaft 36. The pivotal reclaim conveyor assembly 9 is driven by drive motor 29 and speed reducer 43, shown in FIG. 2, mounted to structural support 8.

The plurality of rakes 25 along the bottom of the pivotal reclaim conveyor assembly 9 will move bulk material during operation if the pivotal reclaim conveyor assembly 9 is lowered an appropriate distance by means of hoist 18, hoist cable parts 16 and 19 and boom yoke 20 down into the pile 11 of bulk material and will continue to move bulk material 11 if the pivotal reclaim conveyor assembly 9 is rotated or slewed in the horizontal plane by means of slewing drive 31 and slewing drive chain 30. A control system (not shown) possibly incorporating a programmable logic controller (PLC) provides the necessary functional control of the machine. For operation in cold climates, the plurality of rakes 25 may be installed which contain ice-breaking teeth and may be made sturdier for the purpose intended. The action of bulk material flow is such that material conveyed toward the machine center 14 under the pivotal reclaim conveyor assembly 9 approaches the pivot point 35 and is scooped up by plurality of buckets 27 of the fixed incline conveyor assembly10. The chains of the pivotal reclaim conveyor assembly 9 and fixed incline conveyor assembly 10 operate in opposite directions which mean that material scooped up by the plurality of buckets 27 is carried along the upper chain run of the incline conveyor up to the discharge or head end. This enables icy, chunky or lumpy material to be conveyed by means of plurality of buckets 27 which are less likely to be fouled or jammed by the lumpy material than if they were being conveyed between plurality of rakes 25 against an inclined surface as in existing machines. The relative speed of pivotal reclaim conveyor assembly 9 and fixed incline conveyor assembly 10 are in relation such that the fixed incline conveyor assembly 10 handles all bulk material coming from the pivotal reclaim conveyor assembly 9. The relative size and spacing of plurality of rakes 25 and plurality of buckets 27 are also part of the relation. Any material spilled from the plurality of buckets 27 is caught by subsequent plurality of buckets 27 at the top head on discharge end of the fixed incline conveyor assembly 10, the bulk material spilled from the plurality of buckets 27 and falls into a discharge chute 40 and possibly an additional receiving hopper 41 which funnels the flow of bulk material onto take-away conveyor 42. In an alternate embodiment, receiving hopper 41 and/or discharge chute 40 may be replaced by or supplemented with a separation screen and hammer mill for reducing the icy or lumpy material back to acceptable size before flowing onto take-away conveyor 42.

The support rail ring 4 is mounted on top of rail support 13 generally in the form of a reinforced concrete wall. Support rail ring 4 is generally a selection of heavy railroad or crane rail, which has been curved into a generally circular orientation. Support rail 4 may be formed into a large diameter circle or curve and in combination with a relatively short reclaim conveyor boom can still reach a large volume pile of stored bulk material because the position of the reclaimer conveyor assembly is reaching its storage pile from a larger radius and therefore the pile capacity will be larger. At a reasonable rail diameter a boom length range of approximately 150 to 165 feet can be reached, whereas others for a comparable pile size would need approximately 190 to 210 feet long boom (boom center line boom top to bottom or pivoting point). This is similar or best demonstrated for large piles in U.S. Pat. No. 3,509,985 in FIG. 1 except this patented system uses a retaining wall or transfer table, reclaimer and stacker rotate on same rail serving an endless pile (full pile of 360 degrees), and reclaimer and stacker are centered via a center column with corresponding bearings. A shorter boom generally has fewer maintenance problems than a long boom and associated equipment. A large diameter curved or circular support rail in combination with wheel truck assemblies 3 and 12 eliminates the need for a large, costly center bearing for the reclaimer. The main platform 2 is mounted on top of support legs 5 and 6, which in turn are mounted on wheel tracks 3 and 12. The comparatively large diameter support rail ring 4 combined with the fixed incline conveyor assembly 10 and independent pivotal reclaim conveyor assembly 9 permits a shorter and freer boom design without sacrificing storage pile capacity.

In FIG. 1, it can be seen that the combination of a support rail ring or circle 4 and fixed incline conveyor assembly 10 provides the necessary space for the installation of a separation device such as a disc screen 44 and hammer mill 45 below the main platform 2. The disc screen 44 and hammer mill 45 can be mounted in conjunction with the main platform 2 thereby moving with the machine or stationary mounted above the receiving hopper 41 and take-away conveyor 42. If there is sufficient room beneath the main platform 2, the above combination of equipment can be used in conjunction with a ball bearing instead of a support rail ring, if desired.

The combination of independent pivotal reclaim conveyor assembly 9, fixed incline conveyor assembly 10, separation screen 44 and hammer-mill 45 may be applied to a similar machine on a linear rail or rails, the rail layout as shown in U.S. Pat. No. 4,154,332 (hereby specifically incorporated by reference in its entirety) with parallel rails on the same side of the storage pile or currently used in portal linear reclaimers with two parallel rails, one on each side of the linear pile of stored bulk material.

FIG. 2 shows a close-up view of the knuckle area near the head shaft 35 of the pivotal reclaim conveyor assembly 9 and the tail shaft 37 on the fixed incline conveyor assembly 10. Head sprocket 23 of the reclaim conveyor assembly is mounted on head shaft 35. Tail sprocket 22 of the incline conveyor assembly is mounted on tail shaft 37. Reclaim conveyor assembly chain 26 carries a plurality of rakes 25, which are affixed at intervals along the chain. Incline conveyor assembly chain 28 carries a plurality of buckets 27 affixed at intervals along the chain. Drive motor 29 and speed reducer 43 for the reclaimer conveyor act on the head shaft 35.

Figure 3:
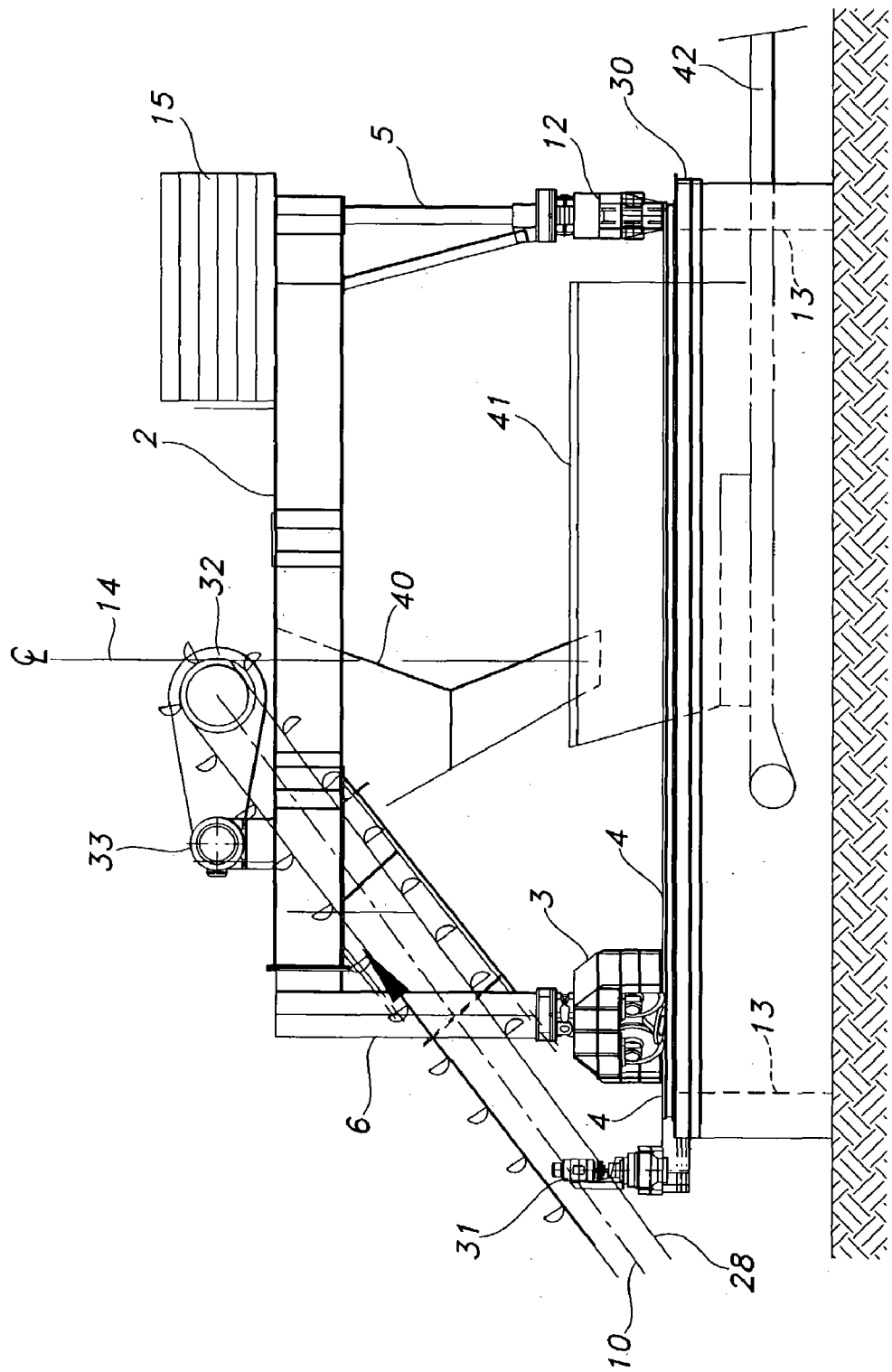
FIG. 3 is a side elevational view showing the incorporation of a separation screen-hammer mill between the discharge end of the incline conveyor and the take-away conveyor assembly.

FIG. 3 shows a close-up view of the main platform 2 of the pivotal reclaim conveyor assembly 9 mounted on wheel trucks assemblies 3 and 12. The wheel truck assemblies 3 and 12 include, but are not limited to, at least one wheel with an axle through its center rotatably supported by bearings, the bearings being mounted to the housing such that the wheels can roll freely. The main platform 2, pivotal reclaim conveyor assembly 9 and fixed incline conveyor assembly 10 move in a horizontal plane about a pivot point on center line 14 and are powered by slewing drive motor and gear reducer 31 acting on stationary chain 30. Support rail ring 4 which supports slewing drive chain 30 around its periphery.

In an alternate embodiment, as shown in FIG. 4 one may combine support rail ring 4, fixed incline conveyor assembly 10, separation screen 44 and hammer-mill 45 along the inclined stacker column of U.S. Pat. No. 4,629,060 (hereby specifically incorporated by reference in its entirety). This combination is particularly suitable for large capacity machines, which is the current trend. Existing stacker-reclaimer of the circular or concentric type are supported by a multiplicity of slewing bearings. Generally, the main platforms carrying the reclaim conveyors are supported by large diameter bearings in the lower part of the machine. The rotatable stacker boom and conveyor is generally supported by a slewing bearing which itself is mounted on a structure attached to the main platform and generally requires a third bearing and reaction arm to isolate the stewing torque of the stacker boom from the stewing torque of the reclaimer boom. In some cases with existing stacker-reclaimers the stacker column assembly is directed straight down and is mounted in the base foundation, thus making the replacement of stewing bearings at the main platform a difficult task.

Referring to FIGS. 4A and 4B, the entire stacker-reclaimer machine 50 is shown. The stacker boom or conveyor assembly 51 is supported on slewing bearing 55, which has a vertical axis of rotation 14 collinear with that of main platform 2 which in turn supports reclaim conveyor assembly 9 and incline conveyor assembly 10. Main platform 2 is supported by front wheel truck assemblies 3 and rear wheel truck assemblies 12, which may roll around support rail ring 4.

Stacker conveyor assembly stewing bearing 55 is supported on an offset or inclined column 54, which is supported by a foundation (not shown) at the base 52 of the offset stacker column 54. This offset column feature provides the advantage of only requiring a single slewing bearing to support the stacker boom 51, and the use of wheel trucks on a curved rail eliminate the need for large slewing bearings to support the main platform.

The association of the offset stacker column 54 with the features of support rail ring 4, wheel truck assemblies 3 and 12, independent reclaim conveyor 9, independent incline conveyor 10, separation screen 44 and hammer mill 45 provides a unique combination of features with value to the industry.

The advantage of the inclined stacker column is the use of a single bearing supported independently from the reclaimer portion of the machine as opposed to the usual practice of mounting the stacker on a column based on the ground immediately below the central part of the machine or upon the reclaimer main platform 2, necessitating a major dismantling of the machine in order to reach the lower bearings for replacement.

Although the foregoing invention has been described in some detail by way of illustration and example for purposes of clarity of understanding, it will be obvious that certain changes and modifications can be made which are within the full scope of the invention.

We claim:

1. A reclaimer apparatus for handling bulk material as located in a pile at a storage site thereof; comprising:
    (i) a platform mounted on one or more track assemblies arranged to roll on at least one rail; said platform having a plurality of means to support a pivotal reclaimer conveyor rake assembly and a fixed incline conveyor bucket assembly;
    (ii) said pivotal reclaimer conveyor rake assembly having a head shaft and a tail shaft, said pivotal reclaimer conveyor rake assembly pivoting on a first axis located at said head shaft, said pivotable reclaimer conveyor rake assembly having means to support a plurality of rakes, said plurality of rakes being spaced at intervals in a continuous loop around said pivotable reclaimer conveyor rake assembly, said pivotable reclaimer conveyor rake assembly being driven by a first motor, located at said head shaft and
    (iii) said fixed incline conveyor bucket assembly having a head shaft and a tail shaft, said fixed incline conveyor bucket assembly located on a second axis on said tail shaft, said fixed incline conveyor bucket assembly having means to support a plurality of buckets, said plurality of buckets being spaced at intervals in a continuous loop around said fixed incline conveyor assembly, said fixed incline conveyor assembly being driven by a second motor located at said head shaft wherein: said first axis is offset from said second axis to permit said plurality of buckets affixed to said fixed incline conveyer assembly to be positioned to receive bulk material from said pivotal reclaimer conveyor rake assembly without moving the reclaimer apparatus toward said pile said reclaimer assembly not having a transfer shoe and not having a transfer table and a retaining wall.

2. The apparatus of claim 1 wherein said one or more wheel track assemblies allow sufficient space beneath said main platform to accommodate a means to capture discharge flow of bulk material from said fixed incline conveyor assembly and to direct said bulk material to a take-away conveyor assembly.

3. The apparatus of claim 1 wherein said at least one rail is in a straight line.

4. The apparatus of claim 1 wherein said at least one rail follows a curved path.

5. The apparatus of claim 1 wherein said apparatus further includes means to separate aggregated material from non-aggregated material.

6. The apparatus of claim 1 wherein said apparatus further includes means to convert aggregated material to nonaggregated material.

7. The apparatus of claim 5 wherein said means to separate is a stationary disc-screen.

8. The apparatus of claim 6 wherein said means to convert aggregated material to nonaggregated material is a hammer-mill.

* * * * *